(12) United States Patent
Montag et al.

(10) Patent No.: US 9,547,784 B1
(45) Date of Patent: Jan. 17, 2017

(54) SENSOR ARRANGEMENT

(71) Applicant: Leuze electronic GmbH + Co. KG, Owen/Teck (DE)

(72) Inventors: Ethan Montag, Rochester, NY (US); Richard Geisler, Rochester, NY (US)

(73) Assignee: Leuze electronic GmbH + Co. KG, Owen/Teck (DE)

( * ) Notice: Subject to any disclaimer, the term of this patent is extended or adjusted under 35 U.S.C. 154(b) by 0 days.

(21) Appl. No.: 14/842,875

(22) Filed: Sep. 2, 2015

(51) Int. Cl.
*G02B 26/00* (2006.01)
*G06K 7/10* (2006.01)

(52) U.S. Cl.
CPC .................. *G06K 7/10722* (2013.01)

(58) Field of Classification Search
CPC ........... B65B 3/003; B65B 3/30; G01B 11/00; G06T 7/0006; G06T 7/602; G06K 9/2036; G06K 7/10366; G06K 19/06009; G06K 19/06046; G06K 19/06196; G06K 19/06; G06K 19/06084; G06K 19/0614; G06K 19/10; G06K 2007/10514; G06K 2019/06253; G06K 2209/03; G06K 7/015; B01L 2300/021; B01L 3/545; B01L 3/5453

See application file for complete search history.

(56) References Cited

U.S. PATENT DOCUMENTS

| | | | | |
|---|---|---|---|---|
| 2006/0178578 | A1* | 8/2006 | Tribble | B65B 3/003 600/432 |
| 2007/0286495 | A1* | 12/2007 | Pine | G06K 9/2036 382/209 |
| 2013/0310990 | A1* | 11/2013 | Peret | F16M 11/041 700/282 |

* cited by examiner

*Primary Examiner* — Thien T Mai
(74) *Attorney, Agent, or Firm* — Michael Soderman

(57) ABSTRACT

The invention relates to a sensor arrangement for the detection of specimen containers within a detection zone, with an optical sensor having an image sensor at a first end of the detection zone, and with a textured background at a second end of the detection zone, A specimen container arranged within the detection zone is detected by the image sensor against the textured background. The specimen container is differentiated from the textured background by an evaluation unit, based on the image signals generated by the image sensor, and object detection signals that identify the specimen container are generated.

16 Claims, 1 Drawing Sheet

SENSOR ARRANGEMENT

CROSS-REFERENCE TO RELATED APPLICATIONS

None.

BACKGROUND

The invention relates to a sensor arrangement for the detection of specimen containers.

Such specimen containers take the form, in particular, of test tubes that are filled with fluid, each being closed by means of a cap. Such test tubes typically contain medical specimens. One example is test tubes filled with blood specimens that are used for blood analysis. The test tubes are automatically allocated to various stations for analysis purposes.

In this connection, the individual test tubes must be detected and identified, especially in order to avoid mix-ups and incorrect allocations.

A code, especially a barcode, is usually applied to each test tube for the purpose of specimen identification.

One known method for detecting such test tubes in an automated system is the use of optical sensors, which typically have an image sensor, i.e. a camera, as a receiver. Such optical sensors must detect both the test tube itself, for example by using contour detection means, as well as the code on the test tube.

U.S. Pat. No. 8,170,322 B2 discloses such an optical sensor by means of which test tubes are detected against a retroreflective background. The highly reflective background results in the specimen test tube appearing as a dark object against this background. Although this arrangement also allows for the reading of codes on test tubes, object detection or object classification is only possible to a limited extent in this case. In particular, no color detection is possible.

Furthermore, it is disadvantageous with regard to such systems that different camera images must be used for object detection, on the one hand, and barcode detection, on the other hand, and these different images are recorded under different lighting conditions.

U.S. Pat. No. 8,170,271 B2 discloses another optical sensor with a camera for the detection of test tubes. In this system, a background having a dark region is used. The test tube is positioned such that the barcode on the test tube can be detected against this background. On the other hand, the test tube is positioned in front of a retroreflective background in order to detect the geometry of the test tube.

U.S. Pat. No. 8,248,590 B2 discloses a sensor arrangement with an optical sensor in which a flat, dark surface is provided to serve as a background, which is laterally limited by retroreflective areas running at an angle to it. Barcodes applied to a test tube can be detected against the dark background surface. The contour of the test tube can be detected by means of light rays emitted by the optical sensor which are conducted to the test tube via the retroreflective areas.

SUMMARY

The invention relates to a sensor arrangement for the detection of specimen containers within a detection zone, with an optical sensor having an image sensor at a first end of the detection zone, and with a textured background at a second end of the detection zone, A specimen container arranged within the detection zone is detected by the image sensor against the textured background. The specimen container is differentiated from the textured background by an evaluation unit, based on the image signals generated by the image sensor, and object detection signals that identify the specimen container are generated.

DETAILED DESCRIPTION

The problem of the invention is to provide a sensor arrangement by means of which it is possible to reliably detect specimen containers with minimal design effort.

The features of claim 1 are provided in order to solve this problem. Advantageous embodiments and expedient further developments of the invention are described in the dependent claims.

The invention relates to a sensor arrangement, for detecting specimen containers within a detection zone, using an optical sensor, which is equipped with an image sensor, at a first end of the detection zone, and having a textured background at a second end of the detection zone. A specimen container arranged within the detection zone is detected by the image sensor against the textured background. The specimen container is distinguished from the textured background in an evaluation unit, based on the image signals of the image sensor, and object detection signals that identify the specimen container are generated.

The basic idea of the invention is to provide a textured background which, on the one hand, can be detected by the optical sensor and, on the other hand, can be clearly differentiated from the optical structure.

It is therefore possible in the evaluation unit to eliminate the background portion from the image recorded by the image sensor of the optical sensor and, in this manner, to separately evaluate the portion of the image containing the test tube. This enables detailed detection of the test tube as a whole as well as parts thereof, or of structures on the specimen test tube.

It is especially advantageous for algorithms to be implemented in the evaluation unit by means of which the textured background can be separated from the specimen container in an image recorded by the image sensor.

In this connection, it is advantageous if the textured background is designed in such a way that its image constituents can be systematically eliminated in an image recorded by the image sensor by means of suitable algorithms, such as filter algorithms. It is advantageous for the textured background to be so designed that its image has regular static properties so that the background portion of the image can be systematically eliminated by means of suitable filter algorithms.

In general, the textured background has an arrangement of pattern segments with different contrasts or colors.

In particular, the textured background has a strip, wave or dot pattern.

According to an especially advantageous embodiment, the textured background has strips oriented diagonally relative to the longitudinal axis of the specimen container.

In this connection, it has been found to be expedient if the strips of the textured background are oriented at an angle of at least approximately 45° relative to the longitudinal axis of the specimen container.

A suitable range for inclination of the strips is approximately 45°±15° relative to the longitudinal axis of the specimen container. This allows for especially good differentiation of the contour of the specimen container from the textured background.

It is advantageous for the textured background to be composed of diffusely reflective patterns. These patterns can be applied to a carrier, for example by means of printing, etching, lithographic processes and similar processes. In this case, the textured background constitutes a passive optical element.

Alternatively, the textured background can also be designed as an optically active element.

The textured background can then have its own illumination source by means of which the patterns of the textured background can be generated, in that the illumination source illuminates transparent or opaque strips of a strip pattern, for example.

An important advantage of the sensor arrangement according to the invention is that the textured background, which is adjusted to the specimen containers that are to be detected, allows for detection not only of the specimen container itself, but also of codes applied to it, namely within a single image recorded by the image sensor. In this manner, by means of the sensor arrangement according to the invention, specimen containers can be detected with great precision and also great speed.

Accordingly, different object detection signals can be generated by the evaluation unit based on the image evaluation, either cumulatively or individually, and they can be adapted to the respective requirements of the application.

For instance, the object detection signal can be designed as a presence signal whose signal states indicate whether a specimen container is present within the detection zone, or not.

Furthermore, the object detection signal can be composed of geometrical data or color information, or components thereof.

It is advantageous for a code to be applied to the specimen container, wherein the object detection signal is composed of code information contained in the code.

Finally, the object detection signal is an object classification signal.

According to an especially advantageous embodiment of the invention, the specimen container takes the form of a test tube and a cap that seals the test tube, wherein the height and/or width of the specimen test tube, and/or the presence, dimensions and/or color of the cap are output as the object detection signal.

It is advantageous for the optical sensor of the sensor arrangement according to the invention to be designed in such a way that the image sensor has a matrix-shaped arrangement of light-sensitive receiving elements.

In particular, the image sensor is designed as a CMOS or CCD sensor.

Furthermore, it is advantageous for the optical sensor to have an illumination unit by means of which the textured background is illuminated.

In this connection, the illumination unit emits diffuse light.

BRIEF DESCRIPTION OF THE DRAWINGS

The invention is explained below based on the drawings, which show.

DETAILED DESCRIPTION OF THE PREFERRED EMBODIMENTS

Figure 1:
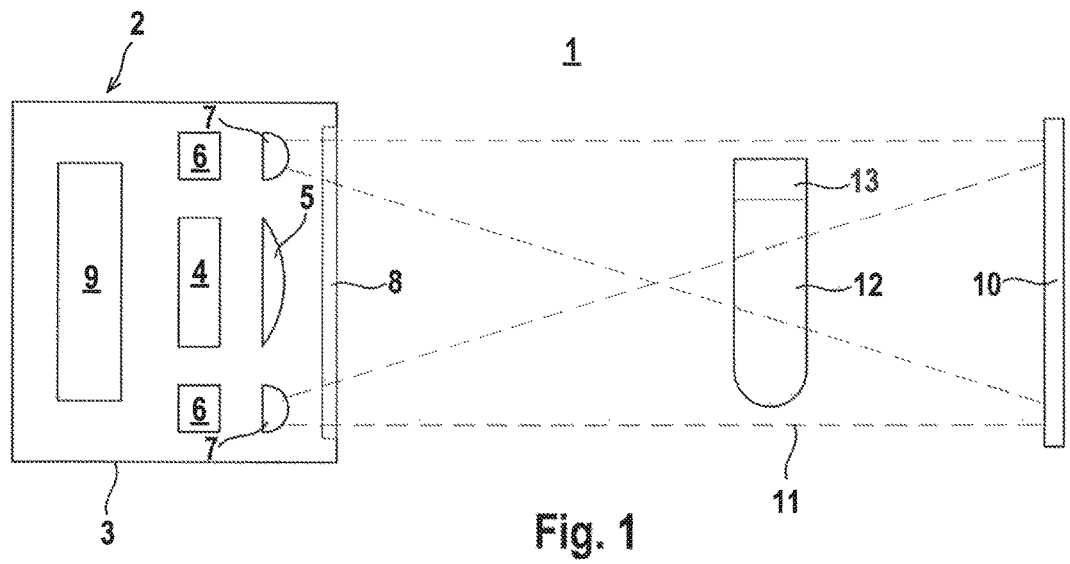
FIG. 1: A schematic representation of an exemplary embodiment of the sensor arrangement according to the invention.

In schematic form, FIG. 1 shows an exemplary embodiment of the sensor arrangement 1 according to the invention for the detection of specimen containers within a detection zone.

The sensor arrangement 1 comprises an optical sensor 2, whose components are arranged within a housing 3. The optical sensor 2 comprises an image sensor 4 with a two-dimensional, rectangular or square arrangement of light-sensitive receiving elements. The image sensor 4 can be designed as a CMOS or CCD sensor. A receiving optical element 5 that constitutes a lens is arranged in front of the image sensor 4.

Furthermore, the optical sensor 2 has an illumination unit, which in the present case is formed by two transmitting units 6, which are arranged on both sides of the image sensor 4. In principle, it is also possible to provide only a single transmitting unit 6. It is equally possible for multiple transmitting units 6 to be arranged in an annular configuration around the image sensor 4. It is advantageous for the, or each, sensor unit 6 to be composed of a light-emitting diode arrangement. The, or each, transmitting unit 6 is associated with a transmitting optical element 7, by means of which the illumination unit emits diffuse light into the detection zone. The image sensor 4 and the transmitting units 6 are arranged behind a window 8 in the front panel of the housing 3.

Furthermore, the optical sensor 2 has an evaluation unit 9, which is formed by a microcontroller or similar. The image sensor 4 and the transmitting units 6 are connected to the evaluation unit 9. The evaluation unit 9 thus controls the illumination unit. Moreover, image signals generated by the image sensor 4 are evaluated in the evaluation unit 9, which results in the generation of object detection signals that can be output via one or more outputs (not shown).

Figure 2:
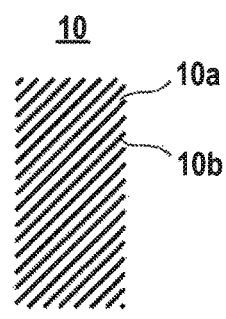
FIG. 2: A top view of the textured background of the sensor arrangement according to FIG. 1.

The optical sensor 2 is located at one edge of the detection zone. At the other end of the detection zone there is a textured background 10 (FIG. 1). As is evident from FIG. 2, the textured background has a surface with a regular arrangement of light-coloured strips 10a and dark strips 10b. The strips 10a, 10b are oriented at a 45° angle to the horizontal. In the present case, the strip pattern is applied to a carrier to form the textured background 10.

The illumination unit of the optical sensor 2 emits light rays 11 in such a way that the textured background 10 is thereby fully illuminated.

The specimen container to be detected is located in the detection zone between the optical sensor and the textured background 10. In this connection, the longitudinal axis of the specimen container is oriented in the vertical direction. The strips 10a, 10b of the textured background 10 are thus oriented at a 45° angle to the longitudinal axis of the specimen container.

Figure 3:
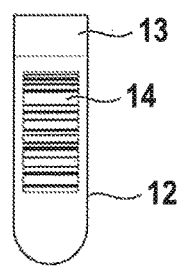
FIG. 3: A top view of a test tube that can be detected by the sensor arrangement according to FIG. 1.

In the present case, the specimen container consists of a test tube 12, whose open upper side is sealed with a cap 13 of a defined color. Inside the test tube 12 there is a fluid for analysis, especially a blood sample. As shown in FIG. 3, a code 14, in the form of a barcode, is applied to the test tube 12. The code segments of the barcode are arranged in the horizontal direction and thus are oriented at an angle of 45° to the strips 10a, 10b of the textured background 10.

The specimen container is detected by the optical sensor 2 against the textured background 10, i.e. the specimen container and the textured background 10 are recorded in an image generated by the image sensor 4.

The strip pattern of the textured background 10 is designed such that, on the one hand, it can be clearly differentiated from all structures of the specimen container and, on the other hand, it can be resolved by the optical sensor 2, i.e. it can be detected within an image generated by the image sensor 4.

By means of the algorithms integrated in the evaluation unit 9, the background portion of the textured background 10 can be eliminated from an image generated by the image sensor 4, so that only the portion of the image containing the specimen container is extracted. In this way, all of the relevant information of the specimen container can be extracted by the evaluation unit 9 from an image generated by the image sensor 4. In the present case, this includes the information encoded in the barcode, the width and height of the test tube 12, the determination whether a cap 13 is present on the test tube 12 and the dimensions and color of the cap 13. Furthermore, detection of the type of cap 13, and therefore, object classification, is possible. The information acquired in this manner can be output individually or cumulatively as an object detection signal by the optical sensor 2.

In the following, a typical image evaluation is explained based on the algorithms implemented in the evaluation unit 9.

First, an image recorded by the image sensor 4 is filtered by means of a one-dimensional filter according to the method of Laws, as described in:

Laws, K. (1979) Texture Energy Measures. In Proceedings: Image Understanding Workshop, DARPA, Los Angeles, Calif., USA, 47-51.

Laws, K. (1980) Rapid Texture Identification. In Proceedings of SPIE—Society of Photo-Optical Instrumentation Engineers—Image Processing for Missile Guidance, San Diego, Calif., USA, July 29-August 1, vol. 238:367-380.

During this filtering, the regular, static structure of the background portion in the image is utilized in that the filter undertakes an adaptation with this background pattern. The structure of the specimen container does not match with this background portion and can therefore be separated from the background portion of the image easily and quickly.

In the image filtered in this manner, the image portions of the background portion appear as white areas.

Subsequent median filtering eliminates noise portions in the image.

Finally, a threshold evaluation of the pixels is performed on the image filtered in this manner, according to the method of Otsu, as described in:

Otsu, N. (1979). A threshold selection method from gray-level histograms. IEEE Trans. Sys., Man., Cyber. 9(1): 62-66:

This threshold evaluation separates dark pixels from light pixels, i.e. a binarized image results in which the dark pixels indicate the contour of the specimen container.

This binarized image is then subjected to a BLOB (Binarized Large Object) analysis, which is described, for example, in the article "Development of FPGA-based real-time BLOB-analysis circuit," J. Trein. A. Schwarzbacher, B. Hoppe, K.-H. Noffz, T. Trenschel in ISSC 2007. This BLOB analysis involves carrying out image processing in such a manner that objects or object features are separated from a background or other objects. A BLOB or an object is defined by a set of pixels in the image, which are interrelated and are differentiated from a background.

The BLOBs obtained with this BLOB analysis contain the information regarding the specimen container that is to be detected. A color analysis of the specimen container is performed based on color measurements, in particular in order to determine the color of the cap 13.

Furthermore, the BLOBs are used to determine the geometrical data of the test tube 12 and of the cap 13.

Finally, the barcode of the test tube 12 is detected using a ROI (Region of Interest) method. The information contained in the barcode is then decoded.

LIST OF REFERENCE NUMERALS (1) Sensor arrangement
(2) Optical sensor
(3) Housing
(4) Image sensor
(5) Receiving optical element
(6) Transmitting unit
(7) Transmitting optical element
(8) Window
(9) Evaluation unit
(10) Textured background
(10*a*) Light-coloured strip
(10*b*) Dark strip
(11) Light rays
(12) Test tube
(13) Cap
(14) Code

The invention claimed is:

1. A sensor arrangement for the detection of specimen containers within a detection zone, with an optical sensor having an image sensor at a first end of the detection zone, and with a textured background at a second end of the detection zone, wherein the textured background has a pattern that is resolved by the image sensor and which is different from the optical properties of the specimen container, wherein a specimen container arranged within the detection zone is detected by the image sensor against the textured background and wherein the textured background is separated from the specimen container via filter algorithms in an evaluation unit for filtering an image detected by the image sensor, the specimen container is then detected, and object detection signals that identify the specimen container are generated.

2. The sensor arrangement according to claim 1, characterized in that the textured background has an arrangement of pattern segments with different contrasts or colors.

3. The sensor arrangement according to claim 1, characterized in that the textured background has a strip, wave or dot pattern.

4. The sensor arrangement according to claim 3, characterized in that the textured background has strips oriented diagonally relative to the longitudinal axis of the specimen container.

5. The sensor arrangement according to claim 4, characterized in that the strips of the textured background are oriented at an angle of at least approximately 45° relative to the longitudinal axis of the specimen container.

6. The sensor arrangement according to claim 1, characterized in that the textured background is designed as an optically active element.

7. The sensor arrangement according to claim 1, characterized in that the object detection signal is designed as a presence signal whose signal states indicate whether a specimen container is present in the detection zone, or not.

8. The sensor arrangement according to claim 1, characterized in that the object detection signal is composed of geometrical data or color information about the specimen container or components thereof.

9. The sensor arrangement according to claim 1, characterized in that a code is applied to the specimen container, and the object detection signal is composed of information encoded in the code.

10. The sensor arrangement according to claim 1, characterized in that the object detection signal is an object classification signal.

11. The sensor arrangement according to claim 1, characterized in that the specimen container is composed of a test tube and a cap that seals the test tube, wherein the height and/or width of the test tube, and/or the presence, dimensions and/or color of the cap, are output as the object determination signal.

12. The sensor arrangement according to claim 1, characterized in that the image sensor has a matrix-shaped arrangement of light-sensitive receiver elements.

13. The sensor arrangement according to claim 12, characterized in that the image sensor is designed as a CMOS or CCD sensor.

14. The sensor arrangement according to claim 1, characterized in that the optical sensor has an illumination unit by means of which the textured background is illuminated.

15. The sensor arrangement according to claim 14, characterized in that the illumination unit emits diffuse light.

16. The sensor arrangement according to claim 1, characterized in that algorithms are implemented in the evaluation unit by means of which it is possible, within an image generated by the image sensor, to separate the textured background from the specimen container.

* * * * *